| United States Patent [19] | [11] 3,870,669 |
|---|---|
| Höfel et al. | [45] Mar. 11, 1975 |

[54] PROCESS FOR THE MANUFACTURE OF DISPERSIONS OF THERMOSETTING REACTION PRODUCTS

[75] Inventors: Heinz-Bernard Höfel; Hans-Joachim Kiessling, both of Hamburg; Fred Lampert, Barsbut; Johann Kühr, Bargteheide, all of Germany

[73] Assignee: Reichhold-Albert-Chemie Aktiengesellschaft, Hamburg, Germany

[22] Filed: June 18, 1973

[21] Appl. No.: 371,045

[30] Foreign Application Priority Data
June 21, 1972 Switzerland.......................... 9344/72

[52] U.S. Cl................. 260/29.3, 260/14, 260/57 R
[51] Int. Cl.............................................. C08g 51/24
[58] Field of Search.................... 260/29.3, 14, 57 R

[56] References Cited
UNITED STATES PATENTS

| | | |
|---|---|---|
| 1,807,545 | 5/1931 | Ostersetzer et al............... 260/57 R |
| 2,245,245 | 10/1941 | Alexander........................... 260/29.3 |
| 2,357,798 | 9/1944 | Niederhauser et al............ 260/57 R |
| 2,443,893 | 6/1948 | Collins................................ 260/29.3 |
| 2,736,718 | 2/1956 | Webber............................... 260/29.3 |
| 2,872,427 | 2/1959 | Schroeder........................... 260/29.3 |
| 3,719,616 | 3/1973 | Ingram................................ 260/29.3 |

Primary Examiner—Lorenzo B. Hayes
Attorney, Agent, or Firm—Gordon W. Hueschen

[57] ABSTRACT

Subject of the invention is a process for the manufacture of water-dilutable, aqueous dispersions, containing emulsifiers and protective colloids, of thermosetting reaction products of monohydroxybenzene compounds or mixtures of monohydroxybenzene compounds with formaldehyde in water, wherein these compounds are reacted with one another in water in the presence of basic nitrogen compounds, whilst warming, in a three-stage process.

4 Claims, No Drawings

PROCESS FOR THE MANUFACTURE OF DISPERSIONS OF THERMOSETTING REACTION PRODUCTS

BACKGROUND OF THE INVENTION

1. Field of the Invention

The present invention relates to a process for the manufacture of water dilutable aqueous dispersions containing emulsifiers and protective colloids, of thermosetting reaction products of monohydroxybenzene compounds or mixtures of monohydroxybenzene compounds with formaldehyde in water, these components being caused to react with one another in water in the presence of basic nitrogen compounds, whilst warming.

Numerous proposals for the manufacture of aqueous dispersions of thermosetting phenolic resins have already been described in the relevant literature. However, the proposals made hitherto have not proved successful in practice so that dispersions of thermosetting phenolformaldehyde resol resins are not yet customary commercially available articles.

2. Prior Art

German Patent Specification No. 838,215 describes a process for the manufacture of stable, aqueous dispersions of soluble phenolic resins which is characterised in that solutions of the phenolic resins in organic solvents are dispersed in water with the aid of soap-like emulsifiers and of polyvinyl alcohol or its water-soluble derivatives.

However, these dispersions have the great disadvantage that the phenolic resin must first be taken up in an organic solvent and hence the dispersion also contains considerable amounts of organic solvents.

In using these dispersions, the organic solvents also have to be evaporated so that expensive equipment must be used in order to meet the environmental standards of industrial hygiene.

German Offenlegungsschrift 1,745,192 describes a process for the manufacture of aqueous emulsions of phenol-formaldehyde resol resins for impregnating fibrous substances, such as paper, in which the phenol is caused to react with an excess of formaldehyde in water in the presence of organic bases containing amino groups, and which is characterised in that the reaction between phenol and formaldehyde is carried out in an aqueous medium in which organic nitrogen bases with tertiary and primary and/or secondary amino groups are present, the ratio between the tertiary amino groups on the one hand and the primary and/or secondary amino groups on the other being between 1:2.5 and 1:1.5. The disadvantage of these aqueous emulsions is that they still contain ions and that therefore they cannot be used to achieve the optimum properties of the impregnated fibrous substances, due to the interfering ion content.

Furthermore, this process only yields aqueous emulsions in which the condensation between phenol and formaldehyde has not been taken to completion. This means that these emulsions still contain free phenol and/or formaldehyde which are both highly toxic so that again, when using these emulsions, special precautionary measures are necessary through the use of expensive installations for avoiding impermissible pollution of the environment.

German Offenlegungsschrift 1,595,038 describes a process for the manufacture of an emulsion of thermosetting low molecular reaction product of a monohydroxybenzene compound or of a mixture of monohydroxybenzene compounds and formaldehyde in water, wherein the compounds mentioned are reacted with one another in water in the presence of a basic substance, using an amide with a long carbon chain as a plasticiser, and which is characterised in that the amide used is oleylamide. These emulsions have the disadvantages already explained above since, being reaction products of low condensation, they still contain considerable proportions of free phenol and/or formaldehyde. Furthermore, the emulsified pheno-formaldehyde resin obtained according to this process is so brittle that it can only be used together with an additional plasticiser, which can result in further disadvantages due to migration of the plasticiser.

German Offenlegungsschrift 2,034,136 describes a phenol-aldehyde condensation product which is characterised in that it is obtained by reaction, at about 60° to 80°C, of a. one mol of a monohydric phenol with at least two hydrogen atoms which are reactive towards an aldehyde and b. at least one mol of an aldehyde of the general formula

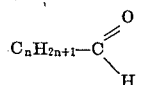

in which $n$ is an integer from 0 to 10, c. in the presence of a salt of a metal of the transition group of the periodic system of the elements and of a monocarboxylic acid of the general formula

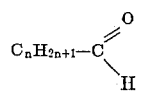

in which n is an integer from 0 to 10, and that it has a strong IR absorption at a wavelength of 1,010 cm$^{-1}$ and 1,050 cm$^{-1}$.

According to the statements on page 23, last paragraph, and page 24, paragraph 1, the phenol-aldehyde condensation product described there, liquified by warming, can be emulsified in an aqueous solution which contains 1 percent of hydroxyethylcellulose and a non-ionic surface-active agent (= Triton X 100) as a 1 percent strength solution, using a special striier. As can be seen from page 13, the resin used contains zinc acetate as the ionic compound stirrer. furthermore the resin additionally contains 12 percent of volatile compounds so that the resin again suffers from the disadvantages mentioned above.

It is the aim of the present invention to improve the phenol-formaldehyde resins of conventional type, present in aqueous distribution, in various directions. As is known, the thermosetting aqueous solutions of phenol-formaldehyde resins can only be stored for a few weeks since they condense further over the course of time and hence lose their solubility in water. However, in order to be capable of storage for at least a few weeks, these solutions must necessarily still contain considerable proportions of free phenol and free formaldehyde. Some types of these phenolic resin solutions are additionally alkaline and therefor contain ions. In using these known aqueous phenol-formaldehyde resin solutions, considerable amounts of phenol and formaldehyde evaporate so that special precautionary measures must be taken to exclude impermissible pollution of the environment by these highly toxic compounds. The phenol-formaldehyde resins contained in the dispersions according to the invention are present in a stable form so that these dispersions can be stored practically indefinitely, which after setting can be converted into dispersions by simply stirring. Furthermore, the proportion of undesired volatile constituents is lower by powers of ten than in the known phenolic resin solutions. Furthermore the phenol-formaldehyde resins contained in the dispersions manufactured according to the invention can be manufactured extremely economically since the starting substances are converted to the resin to the extent of practically 100 percent. This however also results in higher effectiveness during further use, since, in comparison to the previously known aqueous solutions, unreacted reactants are no longer present as ballast substances. Since, unlike previously, no volatile constituents are present during use and instead these constituents have been reacted to give the resin, both the economics of the manufacturing process and the economics of use are improved in an unforeseeable and abrupt manner and a considerable contribution is made to avoiding pollution of the environment.

Furthermore, the dispersions according to the invention have the great advantage that they can also entirely replace the previous phenolic resin solutions in which the phenolic resin is present dissolved in an organic solvent. The previously known phenolic resin solutions also still contain free phenol, free formaldehyde and organic solvent, which in general also has a toxic effect. Hence, considerable advantages in industrial hygiene result from the replacement of these phenolic resin solutions. However, considerable economic advantages also result since the explosion-proof processing installations and solvent recovery installations previously required are unnecessary.

Furthermore, the use of the dispersions manufactured according to the invention is substantially simpler than the use of phenolic resins dissolved in the solvent, since the substrates treated with the dispersions manufactured according to the invention are in general only subjected to a physical drying process and are then in the form of finished goods or semifinished goods which can be processed further.

The Japanese Displayed Specification Sho 46-27256 discloses a process for the manufacture of emulsions of phenolic resins characterized by reacting (a) phenol (10-100 parts by weight), (b) low molecular amino compounds reactive with formaldehyde or xylene (0-90 parts by weight) and (c) aldehyde or similar reacting compounds (0.3 mols relative to 1 mol of the sum of $a$ and $b$, reduced to aldehyde contents) in such a manner that either the components are reacted in the presence of polyvinylalcohol until a product is obtained, which is not soluble in aqueous solutions of pH below 11, and thereafter adding an emulsifier at once, or that the reaction of all components is carried on so long until a product is obtained, which is not soluble in aqueous solutions of pH below 11, and thereafter adding the emulsifier together with ployvinylalcohol at once and converting the reaction mix into a system having a pH of below 11.

The Specification of this Japanese patent application discloses that phenolic resins have to be treated with the emulsifier nearly at once after finishing the reaction. Accordingly no stable emulsions are obtained by addition of the emulsifier to the resin after cooling of the reaction mix nor after heating again.

An addition of emulsifier before finishing the phenol-forming reaction also is not desirable, since the emulsifier reacts with the aldehydes.

According to the teaching of the Japanese patent application the emulsifier may be added only after the phenolic resin has been obtained. Therefore it has been surprising that in the process of the present invention a non-ionic emulsifier is already added during the manufacture of the phenolic resin. Using the same non-ionic emulsifierno water-dilutable emulsions of the type water in resin can be obtained according to the method of the Japanese patent specification, while according to the method of the present invention always water-dilutable dispersions of the type phenolic resin-in-water are obtained. That is even the same emulsifier does not lead to water-dilutable phenolic resin dispersions, if the known method of the Japanese patent application is employed for the production. For this reason the result of the method according to the present invention is rather surprising. The advance over this known working method has been proven to the end of this specification by comparison tests.

SUMMARY

Subject of the invention in a process for the manufacture of water-dilutable, aqueous dispersions, containing emulsifiers and protective colloids, of thermosetting reaction products of monohydroxybenzene compounds or mixtures of monohydroxybenzene compounds with formaldehyde in water, wherein these components are reacted with one another in water in the presence of basic nitrogen compounds, whilst warming, characterised in that, in a three-stage process (1.) first a substituted phenol, formaldehyde or formaldehyde donors and basic nitrogen compounds, selected from the group consisting of ammonia and/or primary or secondary amines, optionally with addition of tert.-amines, are allowed to react, whilst warming, until the formaldehyde has practically been condensed into the product, the substituted phenol and formaldehyde being employed in a molar ratio of 1:1 to 1:2 and the basic nitrogen compound (the parameter is the active hydrogen it contains) being employed in an amount such that the ratio of phenol to the H active equivalent weight of the basic nitrogen compound is 1:1, (2) phenol, at least one non-ionic emulsifier which is compatible with phenolic resin, and further formaldehyde or formaldehyde donor are added to the condensation product obtained, the ratio of the added phenol to the substituted phenol already condensed into the condensation product being so chosen that the average functionality of the sum of the phenolic compounds towards formaldehyde is between 2.1 and 2.8, and the amount of formaldehyde being so chosen that the molar ratio of the total sum of added formaldehyde to the sum of the phenolic compounds from stages (1) and (2) is between 0.9 and 1.5:1, and the batch is warmed until a sample of the condensation product, when withdrawn drawn, has a B-time " of 6 – 15 minutes at 160°C, the batch is cooled to below 100°C and the resulting water-in-phenolic resin dispersion (of the water-in-oil type) is (3) mixed with water and protective colloid and agitated mechanically until a phase inversion of the dispersion has taken place, so that a dispersion of the oil-in-water type is present, and the "phenolic resin-in-water dispersion" is further condensed, by warming, until a sample of the dispersion, when withdrawn, has a B-time of 30 seconds to 10 minutes at 160°C, and thereafter the batch is cooled whilst stirring.

¹⁾ The B-time or curing time is measured similarly to the test procedure 4 described on page 174 of the book "Kunststoff-Praktikum" (Practical Plastics) (Gaeteno D'Alelio, Carl-Hanser-Verlag/Munich, 1952), wherein 0.3 g of resin is stirred, at the indicated temperature, in a bowl of 2 cm diameter and maximum depth 8 mm, by means of a glass rod drawn out to a point, until it cures, and the time required to achieve this is measured.

By thermosetting reaction products of monohydroxybenzene compounds or mixtures of monohydroxybenzene compounds with formaldehyde there are understood resinous condensates such as are known to experts under the name resols (compare Ullmanns Enzyklopaedie der techn. Chemie, Verlag Urban & Schwarzenberg, Munich, Berlin 1962, pages 459–467).

As basic nitrogen compounds which are present during the reaction it is possible to use: ammonia and/or primary and/or secondary and tertiary amines, preference being given to the use of ammonia or of those amines which have a basicity equal to or greater than that of ammonia.

Suitable substituted phenols are those which contain, as substituents, alkyl radicals with 1–30 C atoms, cycloalkyl radicals with 5–10 C atoms which can be of monocyclic or bicyclic structure, alkenyl radicals with 1–30 C atoms and/or cycloalkenyl radicals with 5–10 C atoms, which are again of monocyclic or bicyclic structure. Halogen-substituted phenols and aryl-substituted phenols having an aromatic ring in the substituent are also suitable. These substituted phenols must be so chosen that they possess 1, 2, 3 or 4 substituents on the phenol nucleus of the kind mentioned beforehand but at least 1 carbon atom capable of reaction with formaldehyde must be present in the phenol ring; however, preferred substituted phenols are those which contain 2 carbon atoms, capable of reaction with formaldehyde, on the phenol ring. Substituted phenols with 3 reactive positions in the phenol ring can be used conjointly, as individual compounds or mixtures, in minor amounts.

The following substituted phenols can be used for the present process: o-cresol, p-cresol and m-cresol, 2,4-, 3,4-, 2,6-, 2,3-, 3,5- and 2,5-dimethylphenol, o-ethylphenol, p-ethylphenol and m-ethylphenol, 2,4,5,-trimethylphenol, 2,3,5,6-tetramethylphenol, o-isopropyl-phenol, p-isopropylphenol, o-propylphenol, p-propylphenol m-propylphenol, 2,3-n-dibutylphenol, o-, m- and/or p-n-butylphenol, o-tert.-butylphenol p-tert.-butylphenol, p-n-amylphenol, o- and/or p-n-octylphenol, o- and/or p-n-nonylphenol, p-n-dodecylphenol, o- and/or p-n- and/or isopropenylphenol, o- and/or p-allylphenol, 2,3-dimethyl-4-tert.-butylphenol, o- and p-cyclohexylphenol, o-phenylphenol, p-phenylphenol, m-phenylphenol, o- and/or p-α- and/or β-phenylethylphenol, individually or as mixtures, and also technical alkylation products of olefines and phenols, of which the manufacture has been described, for example, ethylene/phenol substituted phenol reaction products which boil at from 230° to 260°C, and of which substituted phenol reaction product 60 to 70 percent of which dissolves in an alkaline solution, as referred to in British Patent Specification No. 327,382, page 5, lines 25–34, and o-, m- and/or p-chlorophenols and bromophenols. O-cresol, p-cresol, m-cresol, phenol, p-tert. butylphenol, p-n-nonylphenol, p-n-dodecylphenol, o- and/or p-α- and/or -β-phenylethylphenol, individually or in mixture, are preferred. The technical alkylation products of olefines to phenols according to British Patent No. 327,382 are also preferred. The following are suitable as formaldehyde or formaldehyde donors: aqueous formaldehyde solutions, gaseous formaldehyde, paraformaldehyde and hexamethylenetetramine. Aqueous formaldehyde and paraformaldehyde is preferred.

The suitable primary or secondary amines include those organic substances which contain one or more primary amino groups or one or more secondary amino groups — optionally both primary and secondary amino groups — and which are soluble in the reaction mixture and are preferably not less basic than ammonia, which means that the pK value should be ≤ 5 at 20°C. For simplicity, $NH_3$ will in the subsequent text also be included amongst the primary amines. Examples of such amines are: ammonia ($NH_3$), ethylamine, isobutylamine, tertiary butylamine, cyclohexylamine, ethanolamine, diethylamine, diisopropylamine, diethanolamine, piperidine, methylpyrrolidine, morpholine, ethylenediamine, hexamethylenediamine, piperazine, diethylenetriamine, triethylenetetramine and guanidine. Ammonia, dimethylamine, morpholine or diethanolamine are preferred.

The tertiary amines which are optionally used additionally are, for example, organic substances which contain one or more tertiary amino groups and which dissolve in the reaction mixture and are preferably not less basic than ammonia, that is to say the pK-value of the base should be ≤ 5 at 20°C.

Examples of such tertiary amines are: trimethylamine, triethylamine, triisobutylamine, triethanolamine and diethylcyclohexylamine. Trimethylamine, triethylamine and triethanolamine are preferred.

As non-ionic emulsifiers which are compatible with phenolic resin it is possible to use: addition products of ethylene oxide to alkylphenols with one or more substituents, such as are described, for example, in the publication by Farbwerke Hoechst AG, Frankfurt/M., Hoe. 2825 TH/S, of November, 1962, under the title "Arkopal N-Marken" (Arkopal N Grades), wherein 10–35 mols of ethylene oxide are added onto the alkylphenol in the manner of a polyether, as well as ethylene oxide adducts to polypropylene glycols of various chain lengths, such as have been described in the publication by Messrs. C. H. Erbsloh, Duesseldorf, under the title "Pluronic." Futhermore, ethylene oxide addition products to natural resin acids, such as, for example, abietic acid, are suitable, such as have been described in the publication by Farbenfabriken Bayer AG, Leverkusen (Le 681(N) of January, 1968) under the title "Emulsifier U."

As non-ionic agents it is futhermore possible to use polyoxyethylene alkyl ethers, polyoxyethylene alkyl esters, polyoxyethylene sorbitane monoalkyl esters, polyoxyethylene alkylamines, polyoxyethylene alkylamides, polyethyleneimines and other customary non-ionic agents. Addition products of 30 mols ethyleneoxide and p-n-nonylphenol or propyleneglycol with 75–80 mol percent ethyleneoxide are preferred.

Examples of suitable protective colloids which must be added to the dispersions to increase the stability are: polyvinyl alcohol and water-soluble derivatives of polyvinyl alcohol (for example products in which about 5 percent of hydroxyl groups are acetalised, say with butyraldehyde, or in which about 10 percent of the hydroxyl groups are esterified, say with acetic acid) (compare Ullmanns Enzyklopadie der techn. -Chemie, 1962, Vol. 14, pages 236–241) and cellulose ethers which are soluble in boiling water (compare Ullmanns Enzyklopaedie der techn. -Chemi, 1962, Vol. 14, pages 236–241) which can be used conjointly as a constituent. Polyvinyl alcohol being saponified for 88 mol percent and having a polymerization degree of 1,000–1,500 and hydroxyethylcellulose are preferred.

The dispersions manufactured according to the invention can be employed in all fields of use of conventional phenolic resins or phenolic resin solutions and offer, in these fields, additional technical and commercial advantages through avoiding inflammable and/or toxic solvents and through the low contact of unreacted volatile starting compounds. The following may be mentioned as examples of fields of use: Binders for lacquers and coating agents, binders for the manufacture of mineral wool slabs, hard papers and hard fabrics, based on cotton or glass fabrics, for decorative and electronic purposes, battery separators, air filter papers and oil filter papers for motor vehicles, abrasives such as emery paper, emery cloth and emery discs, curable moulding materials for the manufacture of cured shaped articles, such as, for example, brake linings, and binders for materials based on timber, such as plywood, chipboard and hardboard.

EXAMPLE 1

330 g of nonylphenol (1.5 mols), 105 g of 44 percent strength by weight aqueous formaldehyde solution, 34 g of 25 percent strength by weight aqueous ammonia and 15 g of triethylamine are mixed in a flask and kept at the boil under reflux for 1 hour. 100 g of deionised water are then added and 115 ml (a mixture of water and triethylamine) are distilled off. 376 g of phenol, a further 352 g of 44 percent strength by weight aqueous formaldehyde and 80 g of an 80 percent strength by weight aqueous solution of a polyethylene glycol ether of nonylphenol, which contains 30 mols of ethylene oxide per mol of nonylphenol, are added to the residue in the flask. The reaction mixture is kept at the boil, under reflux and whilst stirring, until the B-time at 160°C is 6 minutes. 500 g of deionised water, 30 g of an 88 mol percent saponified polyvinyl alcohol and 10 g of a hydroxyethylcellulose are then added and the reaction mixture is further heated to 90° – 95°C until it has a B-time of 3 minutes. The batch is then cooled to a temperature below 35°C whilst stirring. The reaction product is in the form of a phenolic resin dispersion of the oil-in-water type and the solids content is approx. 50 percent by weight. The storage stability is several months at 20°C. The dispersion can be diluted with water in all proportions and can, if sedimentation phenomena arise, be stirred up again without impairing the properties. The dispersion is miscible with polyvinylacetate dispersion. The viscosity is about 30,000 cP, measured at 20°C. After heat-curing, 99 percent resin yield are found. This means that only 1 percent by weight of resin constituents has been given off as volatile decomposition products.

The properties of a hard paper manufactured with this dispersion (the manufacture of such hard papers is described, for example, in the publications of Reichhold-Albert-Chemie Aktiengesellschaft, Hamburg, of December 1969, entitled "Durophen PP 192" and "Phenodur PR 271") are as follows:

|  | Dispersions according to Example 1 |
|---|---|
| Dielectric loss factor tan δ, DIN 53,483 | |
| 50 Hz | 0.156 |
| 1,000 Hz | 0.056 |
| Dielectric constant DIN 53,483 | |
| 50 Hz | 5.8 |
| 1,000 Hz | 5.0 |
| Surface resistance DIN 53,482 | $3 \cdot 10^{10}$ Ohm |
| Volume resistance DIN 53,482 | $5 \cdot 10^{9}$ Ohm |
| Water absorption DIN 53,475 | 80 mg at 1.4 mm layer thickness |
| Punching index DIN 53,488 | |
| longitudinal | 1.8 |
| transverse | 1.4 |

EXAMPLE 2

The procedure according to Example 1 is followed but instead of the 80 percent strength solution of the polyethylene glycol ether of nonylphenol employed, 35 g of a polyethylene glycol ether of a polypropylene glycol in which 80 mol percent of polyethylene oxide have been reacted, and 36.4 g of an ethoxylated nonylphenol which contains 30 mols of ethylene oxide per mol of nonylphenol, are used. The resulting dispersion is comparable in properties with that obtained according to Example 1.

EXAMPLE 3

The procedure followed is analogous to Example 1 but instead of the 80 g of the 80 percent strength by weight solution of the polyethylene glycol either of nonylphenol, only 40 g are used, and additionally also 36 g of a polyethylene glycol ether of a nonylphenol, which contains 10 mols of ethylene oxide per mol of nonylphenol, is used.

In this case, again, a dispersion of comparable properties to that obtained according to Example 1 is obtained, but the storage stability is slightly impaired.

EXAMPLE 4

The procedure according to Example 2 is used but instead of the 330 g of nonylphenol only 220 g of nonylphenol are employed, instead of the 105 g of 44 percent strength by weight formaldehyde solution 70 g are employed, instead of the 34 g of 25 percent strength by weight aqueous ammonia solution only 22 g are employed and instead of the 15 g of triethylamine 10 g are employed. Furthermore, only 80 ml of deionised water are added and the amount of distillate is reduced from 115 to 90 ml. The phenolic resin dispersion thus obtained shows a lower stability, on storage at 20°C, than does the dispersion obtained according to Example 1. The moulded materials obtained using this dispersion however show higher heat resistance and chemical resistance.

EXAMPLE 5

The instructions in Example 2 are used, but instead of 330 g of nonylphenol 440 g of nonylphenol are now employed, instead of 105 g of 44 percent strength by weight aqueous formaldehyde 140 g are now employed and instead of 34 g of 25 percent strength by weight aqueous ammonia 45 g are now employed. Furthermore, the amount of phenol is now reduced from 376 g to 329 g. Additionally, the mixture is heated, in the second process stage, only to a B-time of 10 minutes at 160°C.

The dispersions thus obtained are distinguished by improved storage stability compared to the dispersions obtained according to Example 1, even if the solids content is lowered to 40 percent.

EXAMPLE 6

The instructions in Example 1 are followed, but instead of 30 g of an 88 mol percent saponified polyvinyl alcohol, only 20 g are now employed and instead of 10 g of hydroxyethylcellulose 15 g are now employed. The resulting dispersion has a higher viscosity (40,000 cP at 20°C) and excellent storage stability.

EXAMPLE 7

225 g of p-tert. butylphenol, 34 g of 25 percent strength by weight aqueous ammonia solution and 105 g of 44 percent strength by weight aqueous formaldehyde solution are kept at the boil for 1 hour under reflux. 376 g of phenol and a further 352 g of 44 percent strength by weight aqueous formaldehyde, and 80 g of an 80 percent strength by weight aqueous solution of a polyethylene glycol ether of nonylphenol, which contains 30 mols of ethylene oxide per mol of nonylphenol, are then added and thereafter the procedure indicated in Example 1 is followed. The dispersion thus obtained show a lower storage stability (7 days at 20°C) than the dispersions obtained according to Example 1.

EXAMPLE 8

The instructions in Example 1 are followed but instead of the 105 g of 44 percent strength by weight aqueous formaldehyde an equivalent amount of 95 percent strength by weight paraformaldehyde and 50 g of deionised water are now introduced. The dispersion has the same properties as the dispersion described in Example 1.

The dispersion obtained according to Example 8 was used for the manufacture of so-called air filter papers or fuel filter papers. The solution of a conventional phenol novolac/hexamethylenetetramine mixture in methanol was used as the comparison binder. Both binders were diluted to a solids content of 10 percent using water in the case of the dispersion and methanol in the case of the novolac solution. A filter paper of a particularly high α-cellulose content, a loose structure and a large pore volume, having medium wet strength and a weight per unit area of 120 g/m², was impregnated with the diluted solutions. After squeezing out the excess binder at 160°C, the product was cured in a circulating air oven for 30 minutes. Different resin contents were obtainable by squeezing out to different extents. The values determined according to DIN53,113, of the dry bursting pressure as a function of the resin content can be seen from the table which follows:

| Resin | Resin content % | Dry bursting pressure, DIN 53,113 kp/cm² |
| --- | --- | --- |
| Dispersion according to Example 8, 10% strength in water | 22 | 4.0 |
|  | 18 | 3.8 |
|  | 14 | 3.4 |
| Phenol novolac/hexamethylenetetramine mixture, 10% Strength in methanol | 23 | 3.3 |
|  | 16 | 2.6 |

It can be seen from the table that the filter papers obtained with the dispersion according to Example 8 show higher bursting pressure values even at substantially lower binder contents. Thus, this example of an application simultaneously shows several advantages, over the state of the art, arising from the use of a dispersion manufactured according to the invention. The process can be carried out with complete exclusion of organic solvents and the end product shows substantially improved quality even though less material is used.

EXAMPLE 9

The instructions according to Example 1 are followed, but instead of the 34 g of 25 percent strength by weight aqueous ammonia a three-fold molar amount of 40 percent strength by weight aqueous dimethylamine solution is now employed. The dispersion thus obtained has a slightly increased content of volatile constituents compared to the dispersion obtained according to Example 1, but shows improved stability.

EXAMPLE 10

The instructions according to Example 1 are followed, but instead of the 80 g of 80 percent strength by weight aqueous solution of the polyethylene glycol ether of nonylphenol, described in Example 1, 40 g of a polyethylene glycol ester of natural resin acid (colophony), which contains 35 mols of ethylene oxide per mol of natural resin acid, and 40 g of a polyethylene glycol ether of 2,4,6-tritert. -butylphenol, which contains 30 mols of ethylene oxide added on per mol of the tri-tert.-butylphenol described, are now employed. The dispersion thus obtained is distinguished, relative to the products obtained in Example 1, by more rapid physical drying on various substrates such as wood, paper, glass and the like.

EXAMPLE 11

The instructions for the process according to Example 1 are followed, but instead of the 88 mol percent saponified polyvinyl alcohol, the same amount of a 98 mol percent saponified polyvinyl alcohol is now employed. The resulting dispersion is distinguished by a very low tendency to foam and by a lower viscosity than the dispersion obtained according to Example 1.

EXAMPLE 12

The instructions in Example 11 are followed, but instead of the 80 g of the 80 percent strength by weight aqueous solution of the polyethylene glycol ether of nonylphenol, described there, only 40 g of this compound and a further 30 g of polyethylene glycol ester of stearic acid, which contains 25 mols of reacted ethylene oxide per mol of stearic acid, are employed. The dispersion thus obtained is distinguished by particularly rapid physical drying.

EXAMPLE 13

The instructions in Example 7 are followed, but instead of the 225 g of para-tert-butylphenol, and equivalent amount of a monosubstituted α- or β-phenylethylphenol is now employed. The dispersion thus obtained is distinguished, relative to that obtained according to Example 7, by improved storage stability and increased flexibility of the hard papers obtained from this dispersion.

The properties of a hard paper manufactured with this dispersion (the manufacture of such hard papers is described, for example, in the publications of Reichhold Albert-Chemie Aktiengesellschaft, Hamburg, of December 1969, entitled "Durophen PP 192" and "Phenodur PR 271") are as follows:

| | Dispersion according to Example 13 |
|---|---|
| Dielectric loss factor tg δ DIN 53,483 | |
| 50 Hz | 0.021 |
| 1,000 Hz | 0.023 |
| Dielectric constant DIN 53,483 | |
| 50 Hz | 4.6 |
| 1,000 Hz | 4.5 |
| Surface resistance DIN 53,482 | $5.10^{12}$ ohm |
| plug (volume) resistance DIN 53,482 | $10^{11}$ ohm |
| Water absorption DIN 53,475 | 28 mg at 1.5 mm layer thickness |
| Electrolytic corrosion DIN 53,489 | A/B 1.6 |
| Punching index DIN 53,488 | |
| longitudinal | — |
| transverse | 2.8 |

EXAMPLE 14

The procedure according to the process of Example 1 is followed, but instead of the 330 g of p-nonylphenol an equivalent amount of p-n-dodecylphenol is now employed. The dispersion thus obtained is distinguished, relative to the product obtained according to Example 1, by improved storage stability and higher flexibility in the cured state so that it can be concentrated by evaporation in vacuo, whereby the proportion of unreacted starting compounds, which is in any case already low, is reduced further.

EXAMPLE 15

The procedure according to the process of Example 1 is followed, but instead of the 330 g of nonylphenol an equivalent amount of an alkylphenol mixture obtained by alkylation of phenol with α-olefines of chain length C–16 to C–20, according to British Patent Specification No. 327,382, page 5, lines 25–34, is employed. The dispersion thus obtained are distinguished by greater storage stability and improved elasticity after curing, as compared to the dispersion obtained according to Example 1.

The dispersions manufactured according to the invention can be employed in all fields of use of conventional phenolic resins or phenolic resin solutions and offer, in these fields, additional technical and commercial advantages through avoiding inflammable and/or toxic solvents and through the low content of unreacted volatile starting compounds. The following may be mentioned as examples of fields of use: Binders for lacquers and coating agents, binders for the manufacture of mineral filled slabs, hard papers and hard fabrics, based on cotton or glass fabrics, for decorative and electronic purposes, battery separators, air filter papers and oil filter papers for motor vehicles, abrasives such as emery paper, emery cloth and emery discs, curable moulding materials for the manufacture of cured shaped articles, such as, for example, brake linings, and binders for materials based on timber, such as plywood, chipboard and hardboard.

Comparison Tests to Prove the Advance over the Art (Japanese Displayed Specifications Sho 46-27256 of Aug. 7, 1971)

TEST 1

330 g nonylphenol (1.5 mols), 105 g of 44 percent strength by weight aqueous formaldehyde solution, 34 g of 25 percent strength by weight aqueous ammonia and 15 g of triethylamine are mixed in a flask and kept at the boil under reflux for 1 hour. 100 g of deionised water are then added and 115 ml (a mixture of water and triethylamine) are distilled off. 376 g of phenol, a futher 352 g of 44 percent strength by weight aqueous formaldehyde are added to the residue in the flask. The reaction mixture is kept at the boil, under reflux and whilst stirring, until the product is unsoluble in water of pH below 11. 500 g of deionised water, 80 g of an 80 percent strength by weight aqueous solution of a polyethylene glycolether of nonylphenol, which contains 30 mols of ethylene oxide per mol of nonylphenol, as well as 30 g of an 88 g mol percent saponified polyvinyl alcohol having a polymerization degree of 1000. Then the reaction mix is cooled. The obtained dispersion of the type water-in-oil cannot be diluted any further with water.

The dispersion contains a phenol contents of 9 percent by weight, relative to the weight of the dispersion.

TEST 2

The instructions given in Test 1 are followed, however, the mixture is kept boiling under reflux whilst stirred until the B-time of the formed resin amounts to 6 minutes at 160°C, before addition of further water and the 88 mol percent saponified polyvinyl alcohol having a polymerization degree of 1000 and before addition of 80 percent strength by weight aqueous solution of a polyethylene glycolether of nonylphenol containing 30 mols ethyleneoxide per mol nonylphenol. The further steps of the method of Test 1 have been followed exactly.

The reaction product is a dispersion of the type water-in-oil being not dilutable with water and having a viscosity of over 100,000 cP.

TEST 3

The instructions given in Test 1 are followed. However, instead of the 80 g of an 80 percent strength by weight aqueous solution of a polyethylene glycol ether of nonylphenol, containing 30 mols of ethyleneoxide per mol of nonylphenol, in this test 50 g of a 50 percent strength by weight aqueous solution of the sodium salt of the half ester of sulfuric acid and polyethylene glycol ether of nonylphenol, containing 30 mols ethyleneoxide per mol nonylphenol are, added. The obtained dispersion of the type oil-in-water can be diluted with any amounts of water. The electrolytical corrosion according to DIN 53489 of a hard (impregnated) paper made therewith, however, shows a value of A/B of 2. That means, the dispersion cannot be used for this purpose.

Test 1 and 2 demonstrate that dispersions obtained according to the known method cannot be diluted with water. According to the present invention always water-dilutable dispersions are obtained.

Test 3 shows, that it is possible to produce water-dilutable dispersions according to the known method. These dispersions, however, give products which do not have sufficient technological properties for the production of hard (impregnated) paper. The water-dilutable dispersions obtained according to the process of the present invention give such products, when employed for hard (impregnated) paper production, which correspond well to the required technological grade.

A preferred embodiment of the invention manifests itself in mixing 1 to 2 mols of nonylphenol, 1 to 2 mols of 44 percent strength by weight aqueous formaldehyde solution, 0.3 to 0.6 mols 25 percent strength by weight aqueous ammonia and 15 g of triethylaminein an flask and kept boiling for one hour whilst refluxing. Then 100 g of deionized water are added and 115 ml are distilled off (mixture of water and triethylamine). The residue in the flask is mixed with 3.5 to 4.5 mols phenol, further 300 to 360 g of 44 percent strength by weight aqueous formaldehyde and 50 to 80 g of 80 percent strength by weight aqueous solution of polyethyleneglycolether of nonylphenol containing 30 mols ethyleneoxide per mol nonylphenol. The batch is kept boiling under reflux whilst stirred until the B-time of the obtained reaction product is 6 – 10 minutes at 160°C. Then 500 g to 600 g of deionized water, 25 – 35 g of polyvinylalcohol being 88 mol percent saponified and 10 to 15 g hydroxyethylcellulose are added, and the batch is heated to 90°– 95°C until the reaction product has a B-time of 3 to 8 minutes. The mixture is now cooled whilst stirred to a temperature of below 35°C. Using the obtained dispersions hard (impregnated) papers are made which show excellent elasticity and water resistance.

The directions given in Example 1 demonstrate the most preferred embodiment of the invention. The dispersions obtained according to this most preferred embodiment have a low content of phenol. Hard (impregnated) papers made therewith shown especially low water absorption. The thus made hard papers have further advantages, such as especially good electrical properties and good ability of being punched.

The dispersions manufactured according to the invention can be employed in all fields of use of conventional phenolic, resins or phenolic resin solutions and offer additional technical and commercial advantages through avoiding inflammable and/or toxic solvents and through the low content of unreacted volatile starting compounds and also through their ability of being deposited electrophoretically. As examples of fields of use there may be mentioned: Binders for water-dilutable lacquers and coating agents for metallic and non-metallic substrates, binders for the manufacture of slag wool slabs, hard papers and hard fabrics, based on cotton or glass fabrics, binders for decorative and electronic purposes, such as battery separators, air filter papers and oil filter papers for motor vehicles, binders for abrasives, such as abrasive paper, abrasive cloth and abrasive discs, thermosetting moulding materials for the manufacture of cured mouldings.

What is claimed is:

1. A process for the manufacture of water-dilutable, aqueous dispersions, containing emulsifiers and protective colloids, of thermosetting reaction products of monohydroxybenzene compounds or mixtures of monohydroxybenzene compounds with formaldehyde in water, wherein these components are reacted with one another in water in the presence of basic nitrogen compounds, whilst warming, characterised in that, in a three-stage process
    1. first a mixture consisting of alkyl phenol, formaldehyde or formaldehyde donors and basic nitrogen compounds, selected form the group consisting of ammonia, primary and secondary amines and mixtures thereof, and optionally with addition of tert.-amines, are allowed to react in the presence of water and in the absence of emulsifiers, whilst warming at the boil, under reflux until the formaldehyde, the ammonia and any primary or secondary amine have practically been condensed into the product, alkyl phenol and formaldehyde being employed in a molar ratio of 1:1 to 1:2 and the basic nitrogen compound selected from the group consisting of ammonia and/or primary or secondary amines, the ratio of alkyl phenol to the active H equivalent weight of the basic nitrogen compound selected from the group consisting of ammonia, primary and secondary amines, and mixtures thereof is 1:1, after removing of the optionally added tert.-amines by distillation,
    2. phenol, at least one non-ionic emulsifier which is compatible with phenolic resin, and formaldehyde or formaldehyde donors are added to the condensation product obtained in above part (1) which does not contain free ammonia and/or primary or secondary amines, the ratio of the added phenol to the alkyl phenol already condensed into the condensation product being so chosen that the average functionality of the sum of the phenolic compounds towards formaldehyde is between 2.1 and 2.8, and the amount of formaldehyde being so chosen that the molar ratio of the total sum of added formaldehyde to the sum of the phenolic compounds from stages (1) and (2) is between 0.9 and 1.5:1, and the batch is warmed at the boil, under reflux, until a sample of the condensation product, when withdrawn, has a curing time of 6–15 minutes at 160°C, the batch is cooled to below 100°C and the resulting water-in-phenolic resin dispersion, of the water-in-oil type, is
    (3.) (3.) with water and protective colloid and agitated mechanically until a phase inversion of the dispersion has taken place, so that a dispersion of the oil-in-water type is present, and the "phenolic resin-in-water dispersion" is further condensed, by warming, until a sample of the dispersions, when withdrawn, has a curing time of 30 seconds to 10 minutes at 160°C, and thereafter the batch is cooled whilst stirring.

2. Method according to claim 1, characterized in that phenol, substituted phenol, o-cresol, p-cresol, m-cresol, p-tert.-butylphenol, p-n-nonylphenol, p-n-dodecylphenol, o- and/or p-α- and/or -β-phenylethylphenol, individually or in mixture, and ethylene/phenol substituted phenol reaction products which boil at from 230° to 260°C, and of which substituted phenol reaction product 60 to 70 percent of which dissolves in an alkaline solution.

3. Water-dilutable aqueous dispersions made according to claiam 1.

4. The water-dilutable aqueous dispersion made by the process of claim 2.

* * * * *

UNITED STATES PATENT OFFICE
CERTIFICATE OF CORRECTION

Patent No. 3,870,669     Dated March 11, 1975

Inventor(s) Heinz-Bernard Höfel, Hans-Joachim Kiessling, Fred Lampert; and Johann Kühr It is certified that error appears in the above-identified patent and that said Letters Patent are hereby corrected as shown below:

[75] Heinz-Bernard Höfel should appear as -- Heinz-Bernhard Höfel --
[75] "Barsbut" should read -- Barsbüttel --

[73] Assignee: Hoechst Aktiengesellschaft, Frankfurt, Germany

Col. 2, line 45: "striier" should read -- stirrer --.

Col. 2, line 48: "compound stirrer. furthermore" should read -- compound and furthermore --

Col. 13, line 46: "shown" should read -- show --

Col. 14, line 64: "claiam 1" should read -- claim 1 --.

Signed and Sealed this ninth Day of September 1975

[SEAL]

Attest:

RUTH C. MASON
*Attesting Officer*

C. MARSHALL DANN
*Commissioner of Patents and Trademarks*